C. A. FRANCIS.
ROAD CART.
APPLICATION FILED APR. 1, 1907.
907,327.
Patented Dec. 22, 1908.
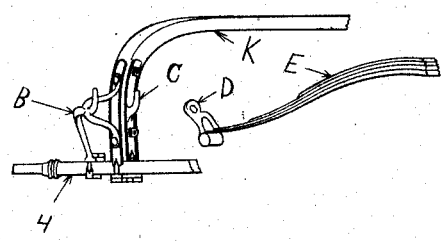
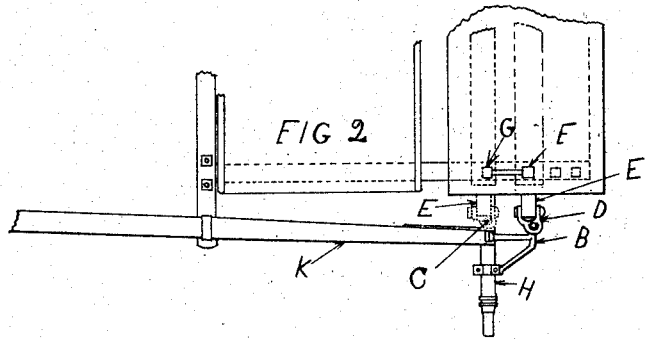
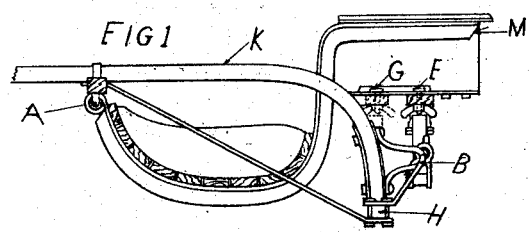
WITNESS
INVENTOR

UNITED STATES PATENT OFFICE.

CHARLES A. FRANCIS, OF SOUTH BEND, INDIANA.

ROAD-CART.

No. 907,327.  Specification of Letters Patent.  Patented Dec. 22, 1908.

Application filed April 1, 1907. Serial No. 365,718.

*To all whom it may concern:*

Be it known that I, CHARLES A. FRANCIS, citizen of the United States, residing at South Bend, in the county of St. Joseph and State of Indiana, have invented certain new and useful Improvements in Road-Carts, of which the following is a specification.

This invention relates to new and useful improvements in two-wheeled vehicles and consists in the peculiar construction of the supports for the seat, whereby the supports may be adjusted to accommodate different loads on the seat, or different distribution of loads on the two sides of the seat, as will be more fully hereinafter described.

In the drawings, the same part is designated by the same letter throughout. As the construction upon the two sides of the vehicle is identical, but one side is illustrated in the drawings and the description is to be understood as applying to either or both sides of the vehicle.

Figure 1 is a vertical side view looking toward the body of the vehicle with the wheel removed. Fig. 2 is a plan view looking downward. Fig. 3 is a perspective view of the supporting devices and of the spring with its supporting loop, taken from the rear of the vehicle, in which—

"A" is the loop by which the front end of the seat is hinged to the cross-bar of the shafts.

"B" is the rear bracket for supporting the springs. "C" is the side bracket for the same purpose.

"D" is the end loop for attaching the spring to the brackets.

"E" is the semi-elliptic spring.

"F" and "G" are bolts for securing the spring bar to the seat. They pass through the bottom sill of the seat box.

"H" is the axle to which one arm of bracket, "B" is attached.

"M" is the angle-iron sill to which the seat and bolt are attached.

"K" is a shaft to which the brackets and axle are secured. One of the supporting spurs or brackets "C" is bolted to the inside of the shaft and as shown in Figs. 2 and 3. The remaining bracket "B" is provided with three arms, two of which are bolted to the rear of the shaft, as shown in Figs. 1, 2 and 3, thus holding the supporting spur to the rear of spur "C", while the remaining arm is carried as a brace to the axle to which it is clipped, as shown at "H", Fig. 2.

The end of the spring "E" is provided with a hinged loop "D", Fig. 3, the eye of which is slipped over one of the spurs "C" or "B" as desired. Spring "E" is bolted at its center to a cross bar which is bolted at its ends to the seat as shown in Figs. 1 and 2. If a light load is to be carried, the spring loops are hooked over the inner spur "C" and the ends of the spring cross bar are bolted to the seat at "G". This increases the leverage on the spring and insures easy riding under a light load. Should the load be heavy, the spring bar is shifted back and secured to the seat at "F" while the spring loops are slipped over the spur of the rear bracket, "B" which gives the spring the advantage in leverage and enabling the spring to support the heavier load with equal elasticity. By attaching the loop on one side to "B" and the one on the other to the forward spur at "C", and also bolting one end of the cross-bar at "F" and the other end as at "G", through the proper holes in the bar, an adjustment for intermediate or unequal loads may be had.

Having thus described my invention, what I claim and desire to secure by Letters Patent of the United States is as follows:—

1. In a road cart, a seat having a pivotal connection with the shafts of the vehicle, a spring connected intermediate of its ends with said seat, said connection being adjustable, and spring supporting means each end of said spring being provided with a loop constructed to detachably engage said supporting means, said supporting means being arranged to provide an adjustment of the position of said spring with relation to said pivotal connection.

2. In a road cart, a seat having a pivotal connection with the shafts of the vehicle, a cross-bar adjustably connected to said seat, a spring connected to said cross-bar intermediate of the ends of the former, and spring supporting means each end of said spring being provided with a loop constructed to detachably engage said supporting means, said supporting means being arranged to provide an adjustment of the position of said spring with relation to said pivotal connection.

3. A road cart provided with shafts carrying supporting hooks which project in different directions, a seat having a hinged connection with said shafts, a spring supporting said seat and capable of being adjusted longitudinally relative thereto, and a loop carried by each end of said spring and adapted to engage with any of the supporting hooks carried by the shafts.

In testimony whereof I affix my signature in presence of two witnesses.

CHARLES A. FRANCIS.

Witnesses:
    LOUIS A. HULL,
    J. DU SHANE.